United States Patent [19]
Watanabe et al.

[11] Patent Number: 5,696,983
[45] Date of Patent: Dec. 9, 1997

[54] DECENTRALIZED SYSTEM CONNECTED BY INDIVIDUAL BUSES AND BUS CONNECTION METHOD

[75] Inventors: Masahiko Watanabe; Yasuo Morooka, both of Hitachi, Japan

[73] Assignee: Hitachi, Ltd., Tokyo, Japan

[21] Appl. No.: 447,511

[22] Filed: May 23, 1995

[30] Foreign Application Priority Data

May 26, 1994 [JP] Japan .................. 6-112442

[51] Int. Cl.$^6$ .......................... G06F 13/12; G06F 15/16
[52] U.S. Cl. .............. 395/800; 395/299; 395/200.15; 395/311; 314/DIG. 1; 314/DIG. 2
[58] Field of Search ............ 395/293, 296, 395/800, 975, 291, 210.02, 308, 200.01, 182.02, 301, 200.16, 299, 309, 392, 311, 706; 364/DIG. 1, DIG. 2; 365/230.05

[56] References Cited

U.S. PATENT DOCUMENTS

| | | | |
|---|---|---|---|
| 4,456,965 | 6/1984 | Graber et al. | 395/308 |
| 4,511,958 | 4/1985 | Funk | 395/182.02 |
| 4,760,515 | 7/1988 | Malmequist et al. | 395/301 |
| 5,280,591 | 1/1994 | Garcia et al. | 395/291 |

*Primary Examiner*—Daniel H. Pan
*Attorney, Agent, or Firm*—Kenyon & Kenyon

[57] ABSTRACT

The disclosed system comprises a plurality of controlling and calculating devices, each controlling and calculating device has a single common bus that is common to all the controlling and calculating devices and two individual buses, and the respective controlling and calculating devices are connected in series by the respective individual buses, whereby each individual bus is commonly shared by respective two of the plurality of controlling and calculating devices and therefore, input and output circuits to an object system are connected to the individual buses thereby performing the control.

3 Claims, 3 Drawing Sheets

DECENTRALIZED SYSTEM CONNECTED BY INDIVIDUAL BUSES AND BUS CONNECTION METHOD

BACKGROUND OF THE INVENTION

1. Field of the Invention

The present invention relates to a system having a plurality of computers and to connection systems in various controlling and calculating devices such as network systems connecting various computers in a traffic system, a general industry system, an in-house information communication system and the like, as well as to a method of constructing a multiprocessor system in a control device digitally controlled by a plurality of microcomputers, etc.

2. Description of the Prior Art

Conventionally, a number of network systems and controlling devices using a plurality of computers have been disclosed. Among them, there have been disclosed Japanese Unexamined Patent Publication No. 36854/1992, Japanese Unexamined Patent Publication No. 369069/1992 and the like as examples each achieving a construction having a common bus for connecting a plurality of processors and common resources such as a common memory as well as two individual buses for connecting individual resources to each processor.

In the conventional technology, common resources such as a common memory, a disk device or an input and output circuit are connected to a common bus for performing information communication among respective microcomputers, and peripheral input and output circuits inherent to each microcomputer for controlling a control object can be connected to individual buses for each microcomputer. Further, the amount of communication on the common bus can be restricted and the function of a multiprocessor system can be prevented from deteriorating by connecting an exclusive communication path communicable only between respective two microcomputers, to the individual bus interface of each microcomputer to thereby perform information communication between the two microcomputers. However, when one microcomputer fails, there has been no device in which the other microcomputer can obtain access to a peripheral input and output circuit connected to the individual bus of the failed microcomputer, and therefore, the processings assigned to the failed computer must be interrupted. That is, in a system dividedly executing processings by a plurality of microcomputers, the entire system must be stopped. Conversely, a system is well known in which a redundant system is constructed by multiple microcomputers and redundant microcomputers take over the processings of a failed microcomputer when a working microcomputer fails, to prevent the system from stopping even if a microcomputer fails. However, in this case, it is necessary to prepare redundant microcomputers which are not ordinarily used and accordingly, the scale of system is magnified.

SUMMARY OF THE INVENTION

It is an object of the present invention to provide a system having a plurality of large-scale computers and microcomputers which are provided with controlling and calculating functions, of which hardware comprises a necessary minimum construction, which achieves the prevention of the deterioration of functions due to an increase in the controlling and calculating function by restricting the amount of communication on buses, which is not halted even when the controlling and calculating function fails, and which system is highly expandable.

To achieve the above object, in a system distributively executing controlling processings of an object by a plurality of controlling and calculating devices, the system is provided with a common bus for communicating information which is common to all the controlling and calculating devices and a plurality of individual buses(local buses) for communicating input and output information that is necessary for an individual controlling processing for each controlling and calculating device, whereby the system is provided with a dual bus construction in which the plurality of the controlling and calculating devices are connected in series by the plurality of the individual buses.

Further, each controlling and calculating device is provided with two individual bus interfaces and each individual bus can be accessed from respective two of the controlling and calculating devices by directly connecting the individual bus interfaces of the respective two controlling and calculating devices through a single individual bus, whereby input and output circuits connected to the respective individual buses can be commonly used by the respective two controlling and calculating devices.

In a system comprising a plurality of controlling and calculating devices, when communication of information among the respective controlling and calculating devices and that of an input and output information inherent to each controlling and calculating device, is achieved by using only a single common bus, the amount of communication of data on the common bus is increased and bus conflict among the respective controlling and calculating devices is increased, which gives rise to the deterioration of processing functions. As a counter-measure therefor, the common bus is used for the communication of information among the respective controlling and calculating devices or the communication of the input and output information common to the respective controlling and calculating devices and the individual buses are provided for respective controlling and calculating devices, to thereby achieve doubling of buses, whereby the amount of communication of data on the common bus can be prevented from increasing and the function of the system can be prevented from deteriorating. Further, the expansion of the controlling and calculating device can be facilitated in the construction in which two of the individual bus interfaces are provided to each controlling and calculating device and contiguous controlling and calculating devices are connected in series.

Further, by the construction in which two of the individual bus interfaces are provided to each controlling and calculating device and contiguous controlling and calculating devices are connected in series, as stated above, a single individual bus is commonly shared by respective two controlling and calculating devices. That is, an input and output circuit connected to each individual bus is commonly shared by the respective two controlling and calculating devices. Accordingly, even in a case where a failure is caused when the operation is being performed by making a single controlling and calculating device access a peripheral circuit via an individual bus, the operation can be continued without stopping the system since a controlling and calculating device that is connected to a failed controlling and calculating device via the individual bus can access the same input and output circuit that is connected to the individual bus, in place of the failed controlling and calculating device.

DETAILED DESCRIPTION

Figure 1:
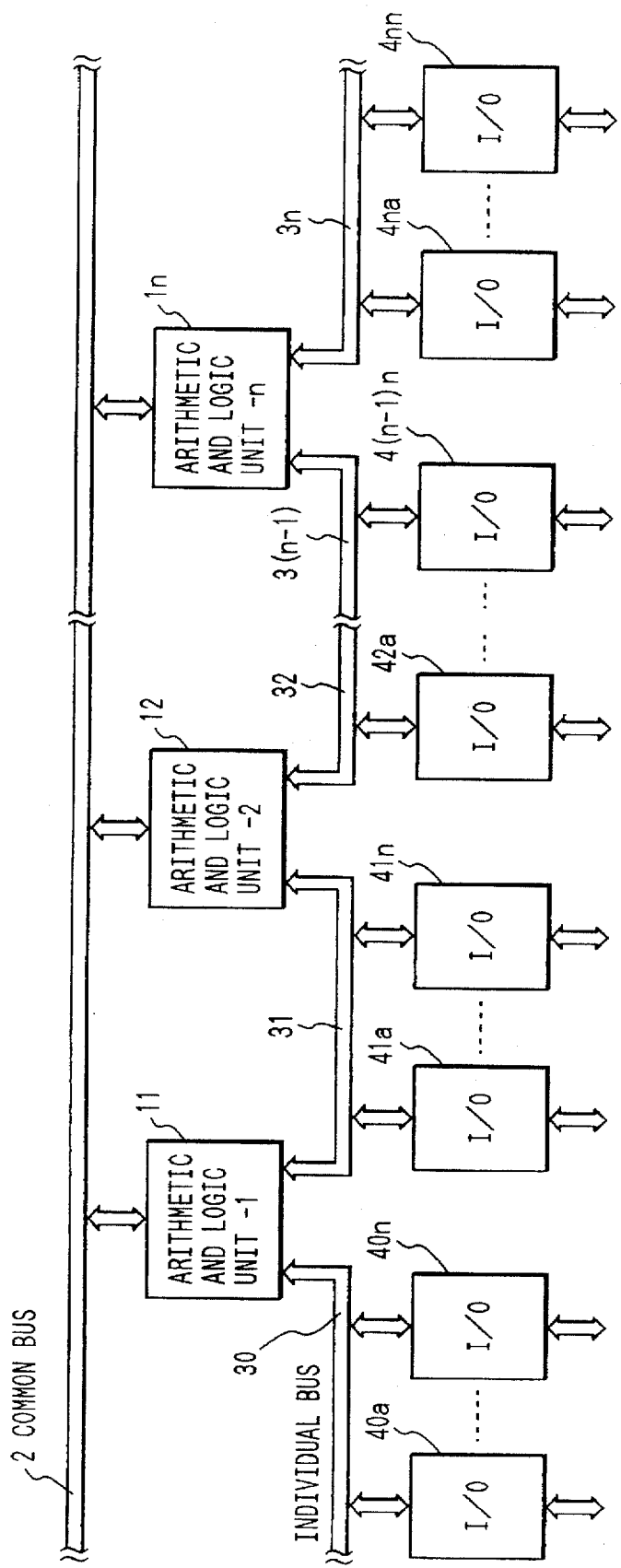
FIG. 1 shows an example of a network system structure according to the present invention.

An explanation will be given of an example of a network system using the present invention in reference to FIG. 1 as follows. In FIG. 1, processings of an object system are distributively executed by a plurality of arithmetic and logic units 11 through 1n. In this system, the communication of information necessary among the plurality of arithmetic and logic units 11 through 1n is performed by using a common bus 2. Further, arbitration circuits preventing bus conflict on the common bus 2 from occurring, are included in the arithmetic and logic units 11 through 1n or other circuit connected to the common bus 2, although they are not shown in FIG. 1. Each of the arithmetic and logic units 11 through 1n is provided with two individual bus interfaces other than the common bus 2, which connect contiguous two arithmetic and logic units in series through individual buses (local buses) 30 through 3n. These individual buses 30 through 3n are connected by input and output circuits (I/O circuit) 40a through 4nn which are necessary for the arithmetic and logic units to which the respective buses are connected, in performing controlling and calculating processings. Thereby, all the input and output circuits 40a through 4nn are accessible by any two of the arithmetic and logic units.

Here, there is an arbitration circuit for each individual bus such that conflict of access on the individual bus does not occur between two arithmetic and logic units connected to each individual bus. That is, each of two individual bus interfaces provided to each of the arithmetic and logic units 11 through 1n, includes the mediating circuit for each individual bus. Accordingly, when all the arithmetic and logic units 11 through 1n are normally operated, each arithmetic and logic unit executes the controlling and calculating processing in accordance with assigned work based on information from the input and output circuits connected to the individual bus.

In such a distributed processing, when a certain arithmetic and logic unit fails, other arithmetic and logic units connected in series to the failed arithmetic and logic unit through the individual buses take over and execute the processing which has been assigned to the failed arithmetic and logic unit. That is, the arithmetic and logic units connected to the failed arithmetic and logic unit through the individual buses are accessible to the input and output circuits which have been accessed by the failed arithmetic and logic unit in normal operation, and therefore, they can take over the processing of the failed arithmetic and logic unit, and a continuous operation is possible without stopping the system irrespective of the failure of the arithmetic and logic unit.

The arithmetic and logic unit in the above example can be realized not only by a general purpose or dedicated computer, but also by a device having various calculating functions such as a microcomputer. Further, it is clear that the common bus or the individual buses are applicable to either of a parallel communication method and a serial communication method.

Further, it is possible to connect information communicating means, such as a lower controlling and calculating means or a storing means other than the input and output circuits, to each individual bus. This example is provided with two kinds of buses of the common bus and the individual buses and accordingly, even when abnormality occurs in either one of these buses, the information communication can be performed by other normal buses which has the effect of promoting the reliability. Further, when information communicating means is provided to each individual bus, information which is used only in respective two arithmetic and logic units connected by the individual bus can be communicated without detouring through the common bus and therefore, the amount of data on the common bus is reduced and accordingly, the function of the system can be prevented from deteriorating.

Figure 2:
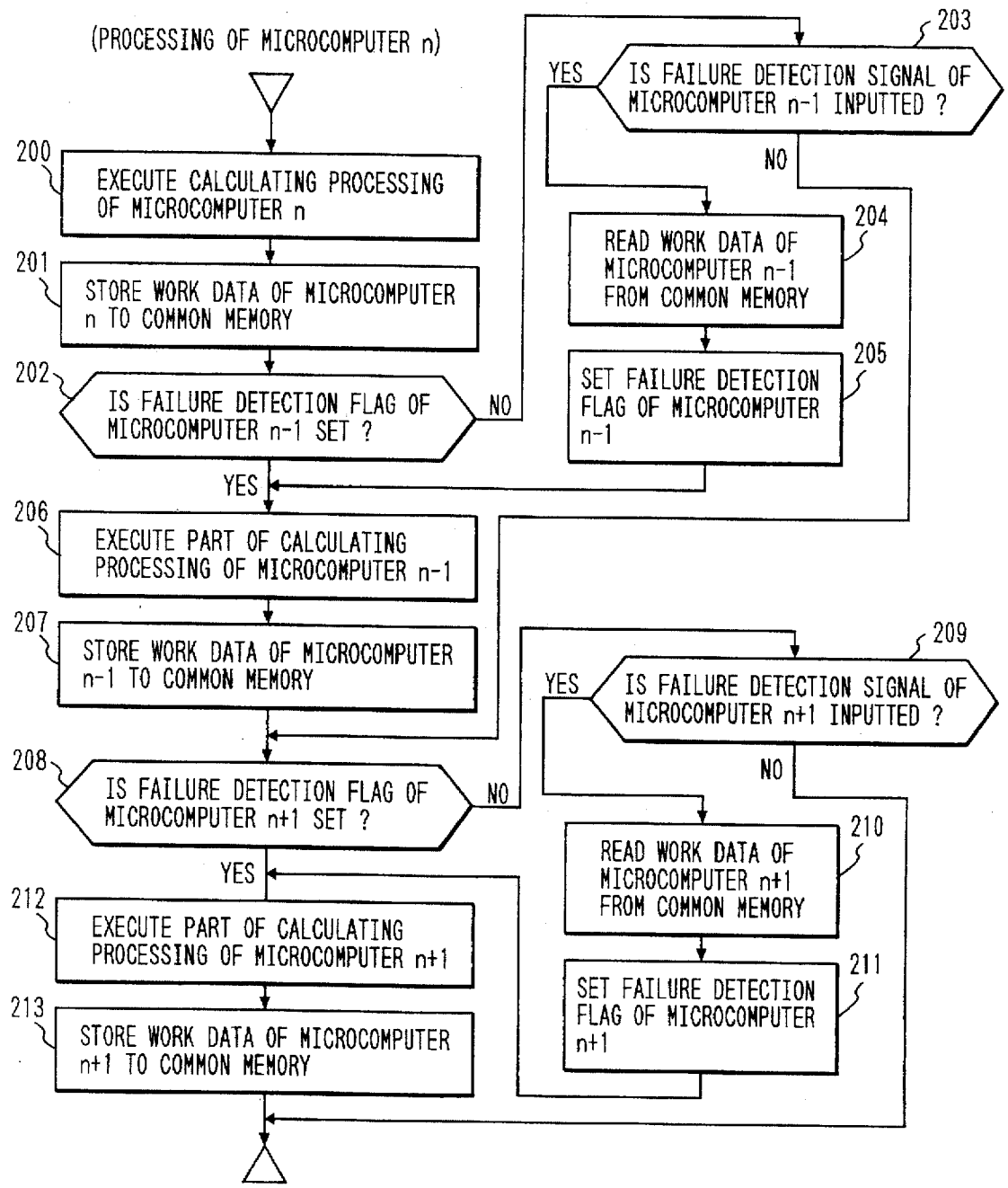
FIG. 2 is a flowchart explaining processings when an arithmetic and logic unit of the example of FIG. 1 is a microcomputer.

Next, an explanation will be given of an example of a backup method when the arithmetic and logic unit fails in the above example with reference to the flowchart of FIG. 2. In this example, a microcomputer is used as the arithmetic and logic unit, and calculating processings are executed by making two microcomputers access to a single individual bus, and a common memory is used in the common bus as information communicating means of the respective microcomputers.

As the content of processing by the microcomputer n, firstly, the microcomputer n executes calculating processing assigned to itself in step 200, and stores the work data of the microcomputer n to the common memory such that other microcomputer n-1 or microcomputer n+1 can perform a backup operation when the microcomputer n fails, in step 201. Thereafter, the operation performs a processing with respect to the microcomputer n-1 shown in steps 202 to 207. In step 202, the operation determines whether the microcomputer n-1 has already been in failure by a flag, proceeds to step 203 when it is not in failure and determines whether a failure detection signal is inputted from the microcomputer n-1, and when it is not inputted, the microcomputer n-1 is normally operated and therefore the operation proceeds to a processing with respect to the microcomputer n+1 shown in step 208 and later steps.

Meanwhile, when the failure detection signal is inputted in step 203, it is immediately after the failure of the microcomputer n-1 and therefore the operation reads the work data of the microcomputer n-1 from the common memory and prepares to execute the processing of the microcomputer n-1 in step 204. Thereafter, the operation sets the flag showing that the microcomputer n-1 is in failure in step 205 and proceeds to step 206. In step 206, the microcomputer n executes the calculating processing assigned to the microcomputer n-1 in place of the microcomputer n-1 and stores the work data to the common memory in step 207. Further, when the microcomputer n-1 has already been in failure in which the flag is set in step 202, the operation similarly executes the processings of step 206 and later steps. Thereafter, the operation executes processings in case where the microcomputer n+1 is in failure from step 208 through step 213 as in the processing of the microcomputer n-1 shown by steps 202 through 207, by which the backup operation of the microcomputer n+1 can be performed and the processing is finished. As is apparent from the above explanation, when a certain microcomputer is in failure, other two microcomputers connected through two individual buses provided to the failed microcomputer, that is, microcomputers contiguous to both sides of the failed microcomputer, are assigned with the processing of the failed microcomputer and execute it.

Figure 3:
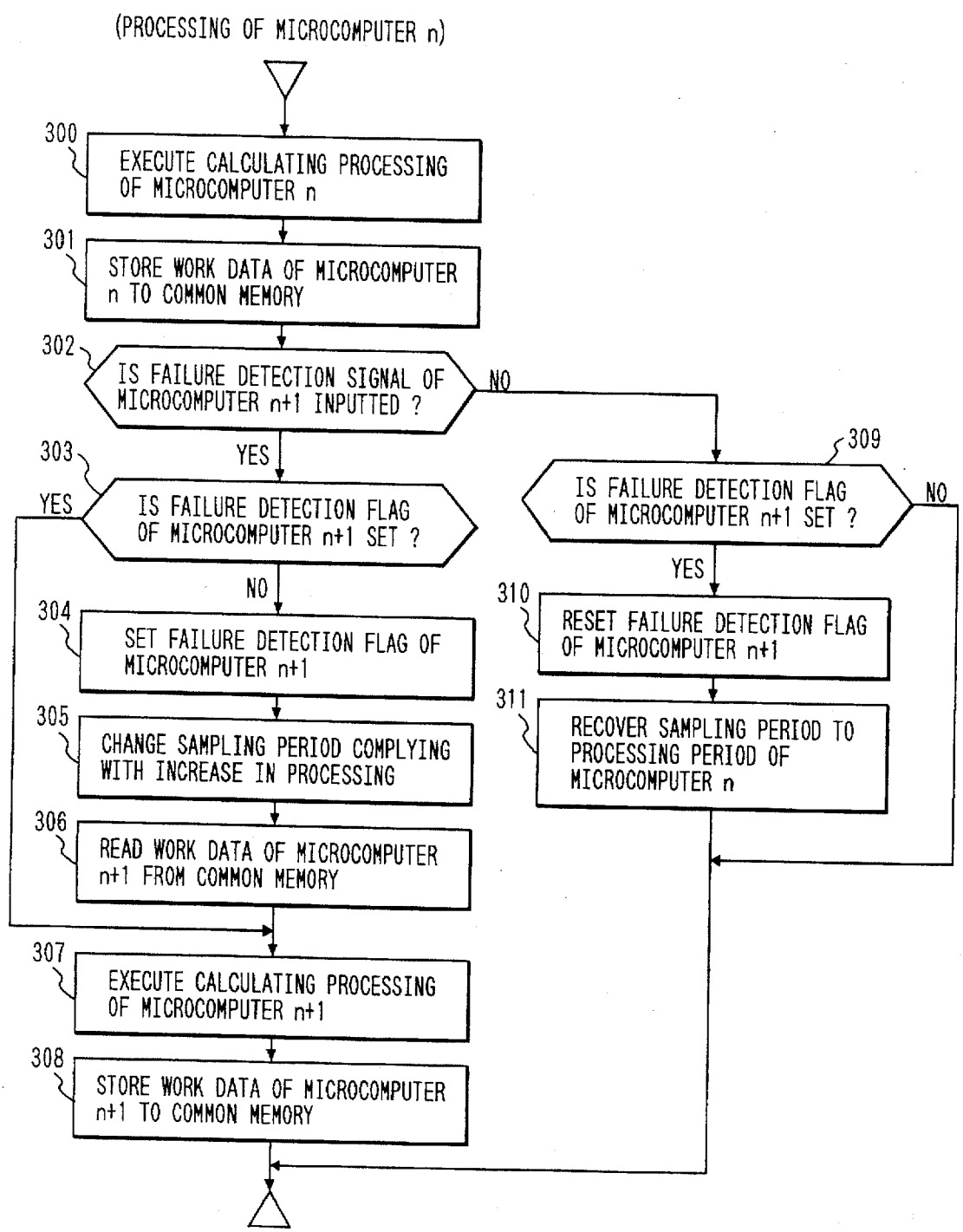
FIG. 3 is a flowchart explaining other processings when the arithmetic and logic unit of the example of FIG. 1 is a microcomputer.

According to this example, the processing of the failed microcomputer can be assigned to the two microcomputers, and therefore, compared with a case where the backup operation is performed by a single microcomputer, the increase in the processing of microcomputer can be halved and accordingly, this example has the effect that the functioning of the microcomputers performing the backup operation as well as the functioning of the system can be prevented from deteriorating. Next, an explanation will be given of another example of a backup method when a microcomputer is in failure as in the above example with reference to the flowchart of FIG. 3. In this example, each microcomputer executes calculating processing by occupying only a single individual bus among respective two individual buses and accessing them in normal operation. That is, in normal operation, the other individual bus is occupied by the other microcomputer and each microcomputer takes over the processing of the failed microcomputer when the other microcomputer is in failure by occupying also the other individual bus. In normal operation, each microcomputer performs the backup operation only with respect to the other microcomputer connected to an individual bus which the microcomputer does not access. Further, a common memory is used in the common bus as in the above example in the information communication among the respective microcomputers.

As the content of processing by the microcomputer n, firstly, the microcomputer n executes calculating processing assigned to itself in step 300, and stores the work data of the microcomputer n in the common memory such that another microcomputer (microcomputer n−1 in this example) can perform a backup operation when the microcomputer n fails, in step 301. Next, the operation investigates an input state of a failure detection signal of a microcomputer n+1 in step 302, and proceeds to step 303 if it is inputted and determines whether the microcomputer n+1 has already been in failure. That is, when the failure detection flag is not set in step 303, the operation determines that it is immediately after the failure of the microcomputer n+1 and sets the failure detection flag in step 304. Next, the operation takes over and executes the processing of the microcomputer n+1 in which, when each microcomputer is processed by sampling, the processing time is increased by an increase due to the processing of the failed microcomputer. Therefore, the operation changes the sampling period of the microcomputer n+1 in accordance with the increase in the processing time in step 305 and thereafter the operation reads the work data of the microcomputer n+1 to prepare to take over the processing in step 306.

In step 307, the operation executes the processing of the failed microcomputer n+1, stores the work data to the common memory in step 308 and finishes the processing of the microcomputer n. Further, when the failure detection flag is set in step 303, the operation proceeds to step 307 since the processings immediately after the detection of failure (step 304 to step 306) is not necessary.

Meanwhile, when the failure detection signal of the microcomputer n+1 is not inputted in step 302, the operation proceeds to step 309 and determines the failure detection flag. When the failure detection flag is set in step 309, the operation determines that the microcomputer n+1 has been in failure until that time (that is, when it recovered from failure), and resets the failure detection flag in step 310. The operation recovers the sampling period which has been changed in compliance with the increase in the processing burden during the failure of the microcomputer n+1 to the normal state in step 311 and finishes the processing. Further, when the failure detection flag is in a reset state in step 309, the operation finishes the processing as it is since the microcomputer n+1 is operating normally.

In this example, only one individual bus is accessed in the normal operation of microcomputers, and two individual buses are in an accessible state in failure thereof. Accordingly, no bus conflict occurs in the respective two individual buses provided to each microcomputer, and no arbitration circuit for the bus is necessary for an individual bus interfacing circuit, which simplifies the hardware. Further, when the processing of the failed microcomputer is assigned to other computers, the system can be operated stably since the sampling period is changed in compliance with the increase in the processing time accompanied by the increase in the burden.

According to the present invention, the network system having the plurality of controlling and calculating functions is of a doubled bus construction having the common bus and the individual buses, a high-speed system can be made possible in which the conflict on the buses is reduced by connecting the input and output circuits inherent to the respective controlling and calculating function to the individual bus, and the respective individual buses are connected to and shared by the two controlling and calculating functions. Therefore, even when one controlling and calculating function fails, the input and output circuits connected to each individual bus can be accessed from the other controlling and calculating function. Accordingly, with respect to the failure of the controlling and calculating function, the normal controlling and calculating function connected to the individual bus can take over the controlling processing of the failed controlling and calculating function, which achieves an effect wherein a nonstop operation of the system can be performed with a minimum construction without the multiplication or redundancy of the controlling and calculating functions.

Further, each controlling and calculating function is provided with two individual bus interfaces and the respective individual bus interfaces are connected in series to other controlling and calculating units, which provides an effect in which the construction of all the controlling and calculating units can be standardized and the expansion of the controlling and calculating functions in accordance with the scale of the system can easily be achieved.

Further, each individual bus is accessible only by two controlling and calculating functions, which achieves an effect in which the processing capability of each controlling and calculating function can be prevented from deteriorating and a highly efficient system can be realized even when the scale of the system is magnified and the number of controlling and calculating functions is increased.

What is claimed is:

1. A decentralized system executing distributed processing comprising a. n controlling and calculating units, where n is equal to or greater than 3, each controlling and calculating unit having a common bus interface and two individual bus interfaces;

b. a common bus coupled to each of said common bus interfaces permitting common use of said common bus by said n controlling and calculating units; and c. n individual buses, each individual bus coupled to individual bus interfaces of two different controlling and calculating units, d. such that only two controlling and calculating units are coupled to each individual bus through one of said individual bus interfaces, and e. such that each controlling and calculating unit is connected with other two controlling and calculating units by two individual buses, whereby said n controlling and calculating means are coupled by said n individual buses to form a single loop, thereby causing said decentralized system to have duplicate buses formed respectively by said common bus and the plurality of individual bus that forms said loop.

2. The decentralized system according to claim 1 wherein:

a. a peripheral input and output unit is coupled to each of said individual buses;

b. during normal operation, each controlling and calculating unit is adapted:
   i. to access the two individual buses that are connected to its two individual bus interfaces, as required; and
   ii. to execute assigned controlling and calculating processing using information obtained from the peripheral input and output units coupled to said individual buses,
   iii. the two controlling and calculating units connected to an individual bus sharing the peripheral input and output unit coupled thereto; and
   iv. each peripheral input and output unit inputting and outputting information that one of said two controlling and calculating units coupled to the individual bus to which it is coupled processes; and c. each controlling and calculating unit is also programmed such that, when one of said controlling and calculating units is in failure:
   i. the two individual bus interfaces of the controlling and calculating unit that is in failure are placed in a nonoperating state,
   ii. the failed controlling and calculating unit is separated from the two individual buses to which it was coupled,
   iii. the two controlling and calculating units coupled to said two separated individual buses access said individual buses through the individual bus interface to which each separated individual bus is coupled, and
   iv. said two controlling and calculating units take over the calculation processing of the failed controlling and calculating unit, whereby, when one of said operation and control units is in failure, the system continues control operating processing.

3. The decentralized system according to claim 1 wherein:

a. a peripheral input and output unit is coupled to each of said individual buses;

b. only one of two controlling and calculating units coupled to an individual bus, is programmed to, during normal operation, access said individual bus, c. said one controlling and calculating unit is programmed to access the peripheral input and output unit coupled to said individual bus, whereby each controlling and calculating unit accesses only one of the two individual buses to which it is coupled during normal operation and, thus, processes only information associated with the peripheral input and output unit associated with said one individual bus; and d. said controlling and calculating units are also programmed such that, when one of said plurality of controlling and calculating units is in failure:
   i. the two individual bus interfaces of the controlling and calculating unit that is in failure are placed in a nonoperating state,
   ii. the failed controlling and calculating unit is separated from the two individual buses to which it was coupled, and
   iii. another controlling and calculating unit accesses the one individual bus previously being accessed by the controlling and calculating unit that has failed to carry out the processing to the failed controlling and calculating unit, whereby, when one of said operation and control units is in failure, the system continues to control operating processing.

* * * * *

UNITED STATES PATENT AND TRADEMARK OFFICE
CERTIFICATE OF CORRECTION

PATENT NO. : 5,696,983
DATED : December 9, 1997
INVENTOR(S) : Masahiko Watanabe, et al.

It is certified that error appears in the above-indentified patent and that said Letters Patent is hereby corrected as shown below:

| Column | Line | |
|--------|------|---|
| 1 | 36 | After "path" insert --,--. |
| 2 | 41 | Change "deteriorating ." to --deteriorating.--. |
| 4 | 14 | Change "deteriorating ." to --deteriorating.--. |
| 4 | 51 | After "207." start new paragraph. |
| 4 | 61 | Change "is in failure, other two" to --fails, two other--. |
| 5 | 7 | Change "deteriorating ." to --deteriorating.--; before "Next" start new paragraph. |

Signed and Sealed this

Sixteenth Day of June, 1998

Attest:

BRUCE LEHMAN

Attesting Officer     Commissioner of Patents and Trademarks